(12) United States Patent
Chen et al.

(10) Patent No.: US 12,353,031 B1
(45) Date of Patent: Jul. 8, 2025

(54) FACET COUPLING FANOUT DEVICE

(71) Applicant: Cisco Technology, Inc., San Jose, CA (US)

(72) Inventors: Long Chen, Marlboro, NJ (US); John Heanue, Manchester, MA (US)

(73) Assignee: Cisco Technology, Inc., San Jose, CA (US)

(*) Notice: Subject to any disclaimer, the term of this patent is extended or adjusted under 35 U.S.C. 154(b) by 142 days.

(21) Appl. No.: 18/157,174

(22) Filed: Jan. 20, 2023

(51) Int. Cl.
*H04B 10/00* (2013.01)
*G02B 6/42* (2006.01)

(52) U.S. Cl.
CPC ......... *G02B 6/4214* (2013.01); *G02B 6/4243* (2013.01)

(58) Field of Classification Search
CPC .................... G02B 6/4214; G02B 6/4243
See application file for complete search history.

(56) References Cited

U.S. PATENT DOCUMENTS

| | | | | |
|---|---|---|---|---|
| 10,641,953 B1* | 5/2020 | Vashishtha | ......... | G02B 6/12002 |
| 10,809,456 B2* | 10/2020 | Lee | ......... | G02B 6/305 |
| 11,243,351 B2* | 2/2022 | Lee | ......... | G02B 6/1228 |
| 11,314,018 B2* | 4/2022 | Ohara | ......... | G02B 6/1221 |
| 2015/0205062 A1* | 7/2015 | Collins | ......... | G02B 6/34 385/14 |
| 2016/0131837 A1* | 5/2016 | Mahgerefteh | ......... | G02B 6/124 385/14 |
| 2016/0327749 A1* | 11/2016 | Jiang | ......... | C23C 14/584 |
| 2017/0097470 A1* | 4/2017 | Jiang | ......... | G02B 6/3636 |
| 2017/0363823 A1* | 12/2017 | Mentovich | ......... | G02B 6/428 |
| 2018/0156970 A1* | 6/2018 | Ohara | ......... | G02B 6/122 |
| 2019/0170941 A1* | 6/2019 | Mahgerefteh | ......... | G02B 6/12004 |
| 2019/0170945 A1 | 6/2019 | Fortusini et al. | | |
| 2019/0285804 A1* | 9/2019 | Ramachandran | ......... | G02B 6/421 |
| 2019/0310423 A1* | 10/2019 | Lee | ......... | G02B 6/305 |
| 2021/0018683 A1 | 1/2021 | Lee | | |
| 2021/0373245 A1 | 12/2021 | Butler et al. | | |

(Continued)

OTHER PUBLICATIONS

R.R. Thomson et al., "Ultrafast-Laser Inscription of a Three Dimensional Fan-Out Device for Multicore Fiber Coupling Applications," Optical Society of America, Published Aug. 29, 2007.

*Primary Examiner* — Agustin Bello
(74) *Attorney, Agent, or Firm* — Patterson + Sheridan, LLP

(57) ABSTRACT

Disclosed is a facet coupling fanout device including a body, a first optical coupling side, and a second optical coupling side. The body defines a plurality of multi-channel waveguides therein. The first optical coupling side optically couples the plurality of multi-channel waveguides to a plurality of waveguide cores of a photonic integrated circuit (PIC). The a second optical coupling side optically couples the plurality of multi-channel waveguides to optical fibers of a fiber array unit (FAU). The first optical coupling side defines a first pitch $P_1$ between the plurality of multi-channel waveguides and the second optical coupling side defines a second pitch $P_2$ between the plurality of multi-channel waveguides where $P_2 > P_1$. The first pitch $P_1$ and the second pitch $P_2$ define a pitch ratio $$R = \frac{P_2}{P_1}.$$

20 Claims, 4 Drawing Sheets

(56) References Cited

U.S. PATENT DOCUMENTS

2023/0228953 A1\* 7/2023 Venkatesan .......... G02B 6/4249
  385/52
2024/0241330 A1\* 7/2024 J?rg ...................... G02B 6/428

\* cited by examiner

FACET COUPLING FANOUT DEVICE

FIELD

This disclosure relates generally to the field of photonic systems and more particularly relates to a facet optical coupler and related apparatus and methods.

BACKGROUND

Contemporary optical communications and other photonic systems make extensive use of photonic integrated circuits that are advantageously mass-produced in various configurations for various purposes. Photonic systems generally include a photonic integrated circuit including integrated optical components on a substrate. A facet optical coupler couples an external optical component, such as an optical fiber, to a waveguide of the PIC via an edge of the substrate.

SUMMARY

In part, in one aspect, the disclosure relates to a facet coupling fanout device, comprising a body defining a plurality of multi-channel waveguides therein, a first optical coupling side, and a second optical coupling side. The a first optical coupling side is configured to optically couple the plurality of multi-channel waveguides to a plurality of waveguide cores of a photonic integrated circuit (PIC). The second optical coupling side is configured to optically couple the plurality of multi-channel waveguides to optical fibers of a fiber array unit (FAU). The first optical coupling side defines a first pitch P1 between the plurality of multi-channel waveguides and the second optical coupling side defines a second pitch P2 between the plurality of multi-channel waveguides. The second pitch P2 is greater than first pitch P1 (P2>P1). The first pitch P1 and the second pitch P2 define a pitch ratio $$R = \frac{P_2}{P_1}.$$

In another aspect of the facet coupling fanout device, the body defines a recess providing a surface for attaching the body to the PIC. In yet another aspect, the body defines an edge configured to abut a side wall of the PIC.

In another aspect of the facet coupling fanout device, the pitch ratio R is selected in a range from 2 to 10. In yet another aspect, the pitch ratio R is selected in a range from 4 to 8. In yet another aspect, the pitch ratio R is selected in a range from 6 to 7.

In another aspect of the facet coupling fanout device, the first pitch P1 is selected in a range from 10 μm to 30 μm.

In another aspect of the facet coupling fanout device, the second pitch P2 is selected in a range from 110 μm to 140 μm.

In part, in one aspect, the disclosure relates to a photonic system, comprising a photonic integrated circuit (PIC) and a facet coupling fanout device optically coupled to the PIC. The PIC comprises a substrate and a cladding formed on the substrate. The cladding comprising a plurality of waveguide cores. A spacing between the plurality of waveguide cores is defined by a pitch S. The facet coupling fanout device comprises a body defining a plurality of multi-channel waveguides therein, a first optical coupling side configured to optically couple the plurality of multi-channel waveguides to the plurality of waveguide cores, and a second optical coupling side configured to optically couple the plurality of multi-channel waveguides to optical fibers of a fiber array unit (FAU). The first optical coupling side defines a first pitch P1 between the plurality of multi-channel waveguides and the second optical coupling side defines a second pitch P2 between the plurality of multi-channel waveguides is P2, wherein P2>P1. The first pitch P1 and the second pitch P2 define a pitch ratio $$R = \frac{P_2}{P_1}.$$

The pitch S is equal to the first pitch P1.

In another aspect of the photonic system, the substrate has a thickness less than 150 μm.

In another aspect of the photonic system, the pitch S is selected in a range from 10 μm to 30 μm.

In another aspect of the photonic system, the pitch S is 20 μm.

In part, in one aspect, the disclosure relates to an optical coupling device, comprising a substrate, a facet coupling fanout device, and a fiber array unit (FAU) optically coupled to the coupling fanout device. The facet coupling fanout device and the FAU are integrated on the substrate.

In another aspect of the optical coupling device, the facet coupling fanout device comprises a body, a first optical coupling side, and a second optical coupling side. The body defines a plurality of multi-channel waveguides therein. The first optical coupling side is configured to optically couple the plurality of multi-channel waveguides to a plurality of waveguide cores of a photonic integrated circuit (PIC). The second optical coupling side is configured to optically couple the plurality of multi-channel waveguides to optical fibers of the FAU. The first optical coupling side defines a first pitch P1 between the plurality of multi-channel waveguides and the second optical coupling side defines a second pitch P2 between the plurality of multi-channel waveguides, wherein P2>P1. The first pitch P1 and the second pitch P2 define a pitch ratio $$R = \frac{P_2}{P_1}.$$

In another aspect of the optical coupling device, the pitch ratio R is selected in a range from 2 to 10.

In another aspect of the optical coupling device, the first pitch P1 is selected in a range from 10 μm to 30 μm.

In another aspect of the optical coupling device, the second pitch P2 is selected in a range from 110 μm to 140 μm.

In another aspect of the optical coupling device, the substrate defines a recess for attaching to a photonic integrated circuit (PIC).

In another aspect of the optical coupling device, the substrate defines an edge to abut a side wall of a photonic integrated circuit (PIC).

In another aspect of the optical coupling device, the substrate defines a groove and a ledge to hold a fiber cable.

Although, the disclosure relates to different aspects and embodiments, it is understood that the different aspects and embodiments disclosed herein can be integrated, combined, or used together as a combination system, or in part, as separate components, devices, and systems, as appropriate.

Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
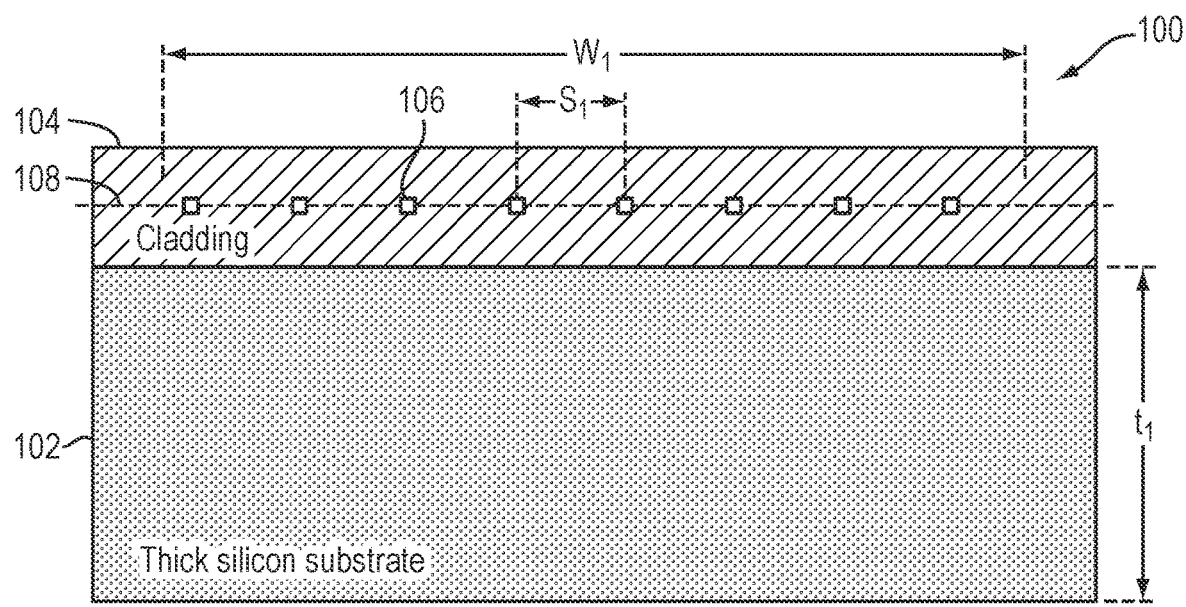
FIG. 1 is a cross-sectional view of a photonic integrated circuit comprising a silicon substrate having a thickness $t_1$ with a cladding formed thereon according to an exemplary embodiment of the disclosure.

In various aspects, the present disclosure provides a facet coupling fanout device. The facet coupling fanout device is disposed between a photonic integrated circuit (PIC) and a fiber array unit (FAU) to optically couple the waveguide cores of the PIC to the fibers of the FAU. The facet coupling fanout device comprises a first side configured to facet couple to the PIC waveguide cores with a first pitch $P_1$ and a second side configured to facet couple to the FAU fibers with a second pitch $P_2$. The second pitch $P_2$ is greater than the first pitch $P_1$ such that the pitch ratio $$R = \frac{P_2}{P_1}$$

can be any value between 1 and 20 and preferably greater than 5.

In one aspect, the present disclosure provides a PIC comprising waveguide cores for facet coupling spaced apart by pitch to match the first pitch $P_1$ of the facet coupling fanout device to reduce the width of the facet coupling region of the PIC. This pitch configuration can be particularly advantageous for PICs having a relatively thin substrate susceptible to warping due to stress, for example. Reducing the width of the coupling region can reduce the relative offset among the waveguide cores in a warped PIC substrate and thus reduce the coupling loss penalty.

Note that we are describing the PIC waveguide cores and FAU fibers with uniform pitches of $P_1$ and $P_2$ respectively for the sake of simplicity. In various aspects, the PIC waveguide cores or the FAU fibers can have non-uniform spacings. In such cases, $P_1$ and $P_2$ can be describing the average spacing, the minimum spacing, or any other appropriate definition. The present disclosure is to reduce the width of the facet coupling region of the PIC by a factor between 1 and 20 and preferably greater than 5.

In one aspect, the facet coupling fanout device defines a recess to rest on a surface of the PIC substrate. The recess of the facet coupling fanout device can be attached to the surface of the PIC with a thin layer of adhesive, such as epoxy, for example. The recess provides a large bonding area to form a strong bond to the PIC substrate.

In another aspect, the facet coupling fanout device can define a length such that the facet coupling fanout device extends beyond the PIC substrate in a direction towards the FAU. This allows the FAU to not overlap vertically with the PIC substrate and to have a thicker lid. Alternatively, the facet coupling fanout device can define a length such that the facet coupling fanout device does extend beyond the PIC substrate. In this configuration, the FAU can employ an ultra-thin lid, or no lid.

In yet another aspect, the facet coupling fanout device can provide mode size adaptation to enable different mode sizes on the PIC coupling side and the FAU coupling side. For example, the PIC coupling side can have smaller mode sizes than the FAU coupling side, if the PIC waveguide cores have smaller mode size than that of the FAU fibers. The PIC coupling side can have larger mode sizes than the FAU coupling side, if the PIC waveguide cores have larger mode size than that of the FAU fibers. The mode sizes on the PIC coupling side or the FAU coupling side could also be different for different channels, if desired.

Referring now to the example embodiment of FIG. 1, there is shown a cross-sectional view of a PIC 100 comprising a silicon substrate 102 having a thickness $t_1$ with a cladding 104 formed thereon according to an exemplary embodiment of the disclosure. The PIC 100 comprises a plurality of optical waveguide cores 106 for facet coupling. The optical waveguide cores 106 are spaced apart by a spacing $S_1$ and are aligned along a substantially straight line 108. The total width of the coupling region is $W_1$. Note that the illustrations of the rectangular waveguide cores and uniform cladding are for simplicity only. In various cases, each waveguide core can be defined by one or more shapes on one layer or multiple layers. The cladding can comprise of different materials. Also as noted above, the spacing between the waveguide cores could be non-uniform, and the waveguide cores could be different for different channels.

Each optical waveguide core 106 defines an optical channel. In the example shown in FIG. 1, the PIC 100 comprises eight optical channels. It will be appreciated, however, that the PIC 100 may comprise more or fewer optical channels. For example, the PIC 100 may comprise 1 to 32 optical channels, or more. The spacing $S_1$ between two optical waveguide cores 106 can be greater than 120 µm as limited by the optical fiber diameter of the FAU. The width of the coupling region $W_1$ can span as much as 1 mm for eight channels.

When the thickness $t_1$ of the substrate 102 is greater than 150 µm, as shown in FIG. 1, the substrate 102 is not subject to warping. In various aspects, the thickness $t_1$ may be 300 µm, 400 µm, 500 µm, 600 µm, or more. If the substrate 102 is not significantly warped, the optical waveguide cores 106 generally lie along a line 108 without displacement away from the line 108 relative to each other. In contrast, if the thickness $t_1$ of the substrate 102 falls below 150 µm, the substrate 102 is subject to warping causing displacement of the optical waveguide cores 106 away from the line 108. The amount of displacement depends on the width $W_1$ of the coupling region, which depends on the number of channels and the spacing $S_1$ between the channels, otherwise referred to herein as the pitch. An example of a PIC having a substrate with a thickness $t_1$ less than 150 µm and subject to warping is discussed below in connection with FIG. 2.

Figure 2:
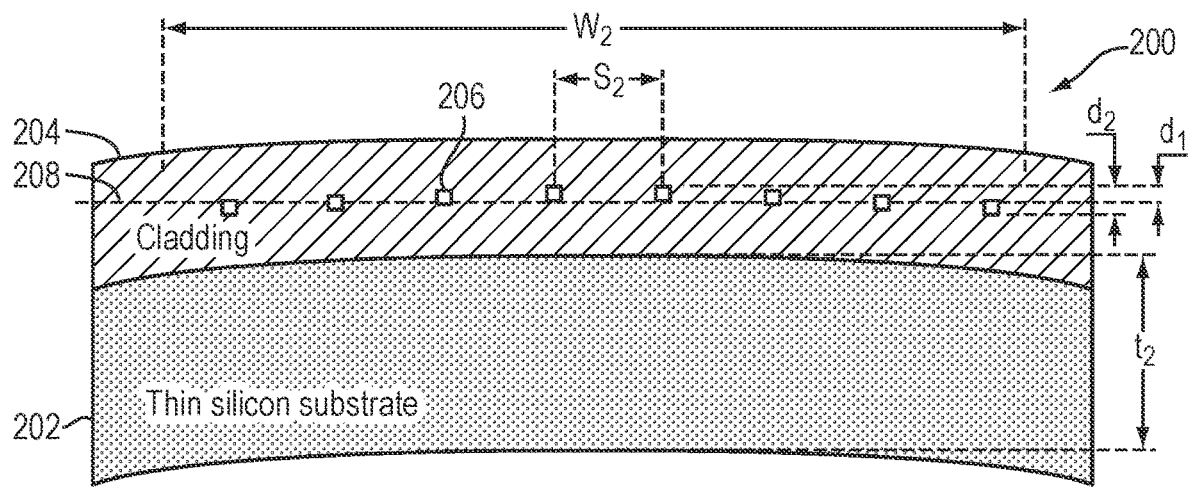
FIG. 2 is a cross-sectional view of a photonic integrated circuit comprising a warped silicon substrate having a thickness $t_2$ with a cladding formed thereon according to an exemplary embodiment of the disclosure.

FIG. 2 is a cross-sectional view of a PIC 200 comprising a warped silicon substrate 202 having a thickness $t_2$ with a cladding 204 formed thereon according to an exemplary embodiment of the disclosure. The PIC 200 comprises a plurality of misaligned optical waveguide cores 206 for facet coupling. The optical waveguide cores 206 are spaced apart by a spacing $S_2$ and are not aligned along a line 208 due to the substrate 202 being warped and define more of a curvature. The total width of the coupling region is $W_2$.

Each optical waveguide core 206 defines an optical channel. In the example shown in FIG. 2, the PIC 200 comprises eight optical channels. It will be appreciated, however, that the PIC 200 may comprise more or fewer optical channels. The spacing $S_2$ between two optical waveguide cores 206 can be greater than 120 µm as limited by the optical fiber diameter of the FAU. The width of the coupling region $W_2$ can span as much as 1 mm for eight channels and the relative offset can be >1 µm, causing extra coupling loss penalty. It will be appreciated that each 1 µm of offset can contribute to about a 0.25 dB penalty.

When the thickness $t_2$ of the substrate 202 is less than 150 µm, as shown in FIG. 2, the substrate 202 is subject to warping. Substrate 202 warping poses a significant issue when multiple optical fiber coupling is required between the PIC 200 and a FAU. Unlike the example shown in FIG. 1, where the optical waveguide cores 106 are aligned along a line 108, due to warpage, of the substrate 202, the optical waveguide cores 206 are not aligned along line 208. Rather, the optical waveguide cores 206 are displaced ($d_1$, $d_2$) relative to each other away form the line 208. Notably, the displacement $d_2$ of optical waveguide cores 206 closer to the edges of the PIC 200 is greater than the displacement $d_1$ of optical waveguide cores 206 closer to the center of the PIC 200. The amount of displacement ($d_1$, $d_2$) depends on the width $W_2$ of the coupling region, which depends on the number of channels and the spacing $S_2$ between the channels, otherwise referred to herein as the pitch.

According to the present disclosure, reducing the pitch, or the spacing $S_2$ between the optical waveguide cores 206, reduces the width $W_2$ of the coupling region. A reduced pitch configuration can substantially reduce the relative vertical displacement offset ($d_1$, $d_2$) of the channels away from the line 208 and substantially reduce the coupling loss penalty due to misalignment of the optical waveguide cores 206 with a FAU either directly or through a facet coupler.

As shown in FIG. 2, the relative displacement $d_1$ near the center of the substrate 202 due to warpage is much less than the relative displacement $d_2$ near the edge of the substrate 202. Therefore, reducing the pitch, e.g., the spacing $S_2$, between the optical waveguide cores 206 can reduce the effects of the displacement offset ($d_1$, $d_2$) due to a warped substrate 202. It will be appreciated that substrate 202 warpage also effects the displacement of the optical waveguide cores 206 in the direction of the line 208. The effect of such displacement, however, is negligible compared to the displacement contribute much less to the coupling loss attributable to the displacement offset ($d_1$, $d_2$) away from the line 208. Reducing the spacing $S_2$ or pitch between the optical waveguide cores 206 also reduces the coupling loss penalty contributed by misalignment in the direction of the line 208.

By way of example, if the pitch or spacing $S_2$ between the optical waveguide cores 206 is ≈120 µm the width $W_2$ of the coupling region for an eight-channel device is ≈960 µm. Reducing the pitch or spacing $S_2$ to ≈20 µm reduces the width $W_2$ of the coupling region to ≈160 m. This is a six-fold reduction in the width $W_2$ of the coupling region.

When the substrate 202 has a thickness $t_2$ less than 150 µm, it poses additional challenges in photonic system design. For example, unless the PIC 200 is overhung from a substrate (e.g., substrate 306 shown in FIG. 4), the FAU must have a small distance between the center of a fiber and the bottom surface of the FAU. Since the fiber diameter of an FAU is typically 80 µm or more, a lid covering the optical fibers in the FAU must be very thin or non-existent. In addition, the bonding area between the PIC 200 and the FAU becomes rather small to provide an adequate bond therebetween.

Figure 3:
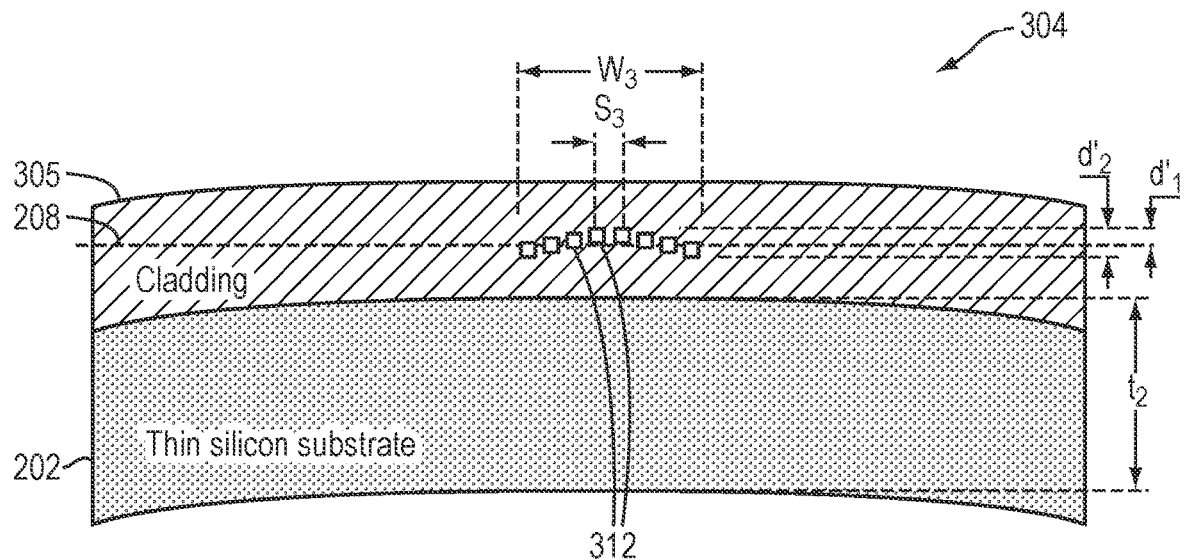
FIG. 3 is a cross-sectional view of a photonic integrated circuit comprising a warped silicon substrate having a thickness $t_2$ with a cladding formed thereon according to an exemplary embodiment of the disclosure.

FIG. 3 is a cross-sectional view of a PIC 304 comprising a warped silicon substrate 202 having a thickness $t_2$ with a cladding 305 formed thereon according to an exemplary embodiment of the disclosure. The PIC 304 comprises a plurality of misaligned optical waveguide cores 312 for facet coupling and defines a coupling region having a relatively narrow width $W_3$. The spacing or pitch $S_3$, between the optical waveguide cores 312 shown in FIG. 3 is approximately six times smaller than the spacing $S_2$ between the optical waveguide cores 206 shown in FIG. 2 and thus reduces the effects of displacement offset ($d'_1$, $d'_2$). It will be appreciated that the spacing $S_3$ or pitch $P_1$ may be selected to achieve a desired reduction in displacement offset ($d'_1$, $d'_2$) to achieve a desired reduction in the coupling loss between the PIC 304 and a FAU, either directly or through a facet coupling fanout device disposed between the PIC 304 and the FAU. In one embodiment, the pitch $S_3$ can be selected in a range from 10 µm to m and preferably can be selected as 20 µm.

Figure 4:
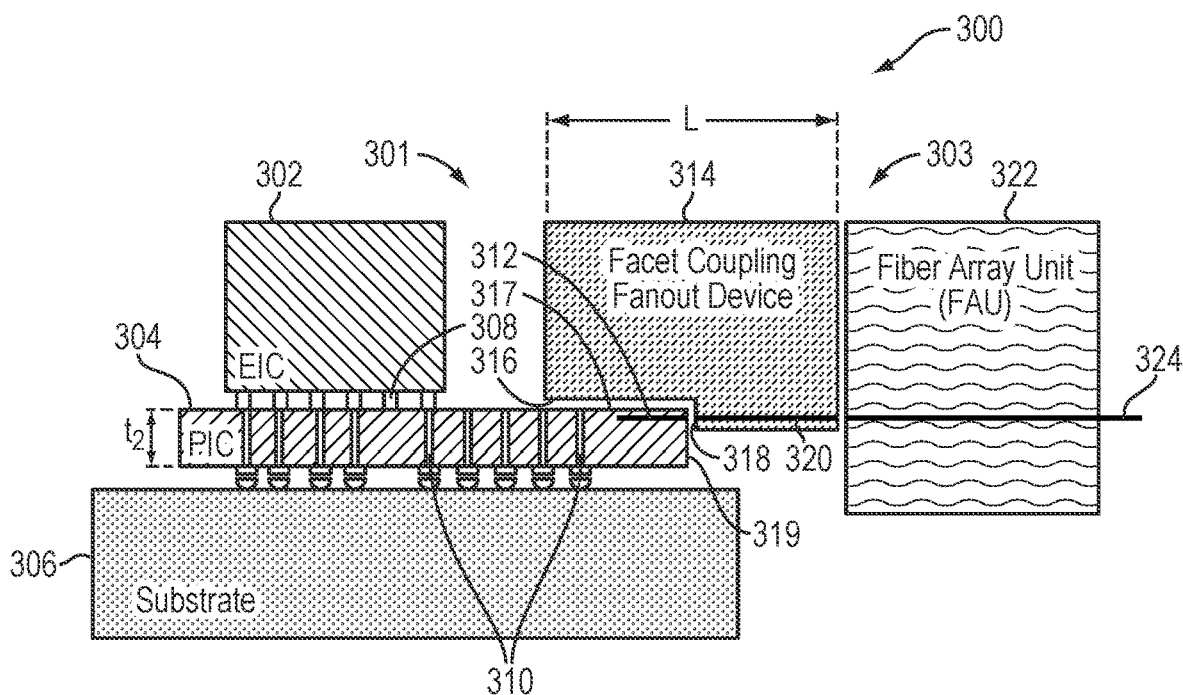
FIG. 4 is a side view of a photonic system comprising a facet coupling fanout device coupled between the photonic integrated circuit shown in FIG. 3 and a fiber array unit according to an exemplary embodiment of the disclosure.

FIG. 4 is a side view of a photonic system 300 comprising a facet coupling fanout device 314 coupled between the PIC 304 shown in FIG. 3 and a FAU 322 according to an exemplary embodiment of the disclosure. The photonic system 300 comprises an electronic integrated circuit 302 (EIC) electrically coupled to the PIC 304 by way of conductive bumps 308. The PIC 304 and the EIC 302 are electrically coupled to a substrate 306 by way of through silicon vias 310 (TSV). The PIC 304 is optically coupled to a facet coupling fanout device 314, which is optically coupled to the FAU 322.

The PIC 304 has a thickness $t_2$, which is less than or equal to approximately 150 µm making the substrate of the PIC 304 susceptible to warping as described above in connection with FIGS. 2 and 3. As shown in the example embodiment of FIG. 4, the facet coupling fanout device 314 comprises a first optical coupling side 301 configured to optically couple to the PIC 304 and a second optical coupling side 303 configured to couple to the FAU 322. On the first optical coupling side 301, the optical waveguide cores 312 are facet coupled to corresponding multi-channel waveguides 320 of the facet coupling fanout device 314. As described in connection with FIG. 3, any offset or misalignment of the optical waveguide cores 312 of the PIC 304 can be minimized by reducing the pitch $P_1$ between the optical waveguide cores 312. As shown in FIG. 4, on the second optical coupling side 303, the multi-channel waveguides 320 of the facet coupling fanout device 314 are optically coupled to an optical fiber bundle 324 of the FAU 322.

In one embodiment, the body 325 of the facet coupling fanout device 314 defines a shallow recess 316 that provides a surface for attachment to a surface 317 of the PIC 304. The body 315 of the facet coupling fanout device 314 also defines an edge 318 that abuts a side wall 319 of the PIC 304. The shallow recess 316 of the facet coupling fanout device 314 can partially rest on the surface 317 of the PIC 304 and be attached thereto with a thin layer of adhesive, such as epoxy, for example. The shallow recess 316 provides a large bonding area to form a strong bond with the PIC 304.

In the embodiment shown in FIG. 4, the facet coupling fanout device 314 has a length L such that a portion of the facet coupling fanout device 314 extends beyond the edge of the substrate 306. This configuration allows the FAU 322 to have a thicker lid than otherwise allowed. Alternatively, in another embodiment, the facet coupling fanout device 314 may not extend beyond the edge of the substrate 306 such that the FAU 322 can use an ultra-thin lid or no lid.

In other embodiments, the facet coupling fanout device 314 can also provide mode size adaptation. The facet coupling fanout device 314 can be configured to allow different mode sizes on the first optical coupling side 301 and the second optical coupling side 303.

Although the facet coupling fanout device 314 does add one extra coupling compared with direct butt coupling of the FAU 322 to the PIC 304, the facet coupling fanout device 314 to FAU 322 coupling can achieve 0.5 dB per coupling. The improvement due to the smaller displacement offset (d'1, d'2 as shown in FIG. 3) resulting from a reduced pitch can more than the offset the loss due to the extra coupling.

Figure 5:
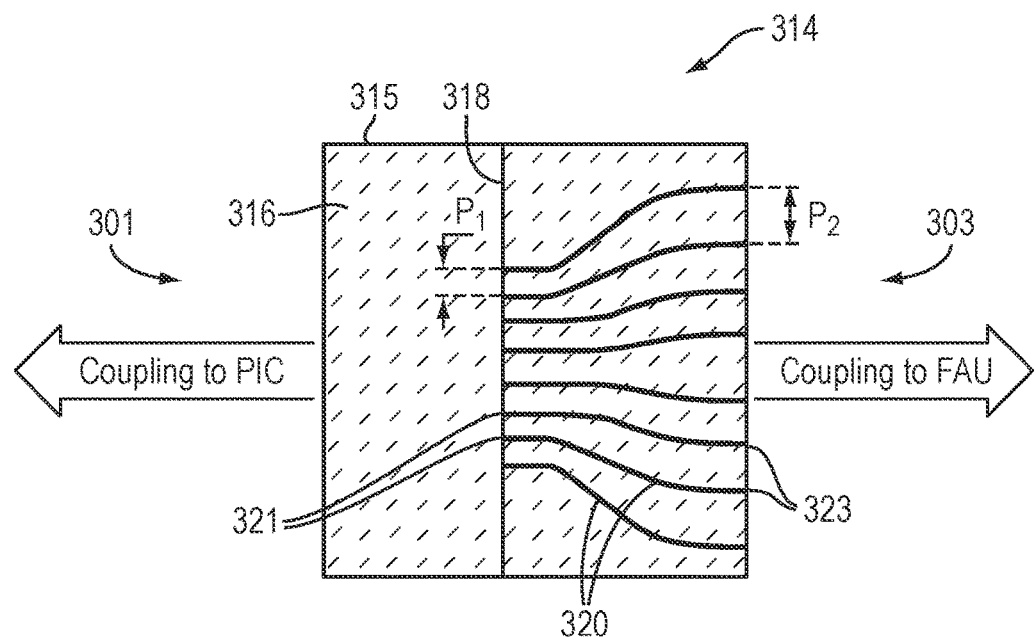
FIG. 5 is a top view of a facet coupling fanout device according to an exemplary embodiment of the disclosure.

FIG. 5 is a top view of a facet coupling fanout device 314 according to an exemplary embodiment of the disclosure. The facet coupling fanout device 314 comprises a body 315 with multi-channel waveguides 320 formed therein. The facet coupling fanout device 314 comprises a first optical coupling side 301 and a second optical coupling side 303. The first optical coupling side 301 defines a first pitch $P_1$ between the multi-channel waveguides 320 for optical coupling to the PIC 304 (FIG. 4). The second optical coupling side 303 defines a second pitch $P_2$ between the multi-channel waveguides 320 for coupling to the FAU 322 (FIG. 4). The second pitch $P_2$ is greater than the first pitch $P_1$ (e.g., $P_2 > P_1$). In one embodiment, the pitch ratio can be defined as $$R = \frac{P_2}{P_1}.$$

In various embodiments, R can be selected in a range from 1 to 10, more particularly R can be selected in a range from 4 to 8, and in the example shown in FIG. 3, R can be selected in a range from 6 to 7. In other words, the ratio R of the spacing $P_2$ and $P_1$ is $$R = \frac{P_2}{P_1} = \frac{120 \text{ µm}}{20 \text{ µm}} = 6.$$

In one embodiment, R can be greater than 6 to provide a greater than six-times (>6×) reduction. The facets 321 of the multi-channel waveguides 320 are aligned along the edge 318 below the shallow recess 316 to couple to the facets of the optical waveguide cores 312 on the side wall 319 Of the PIC 304. The facets 323 of the of the multi-channel waveguides 320 are aligned to couple to facets on the FAU 322. As noted before, here the uniform pitches of $P_1$ and $P_2$ are used only for the sake of simplicity. Non-uniform spacings can be used on either or both sides. The principle of the fanout is to reduce the total width of the coupling region on the side coupling to the PIC compared with the side coupling to the FAU.

A reduced width coupling region ($W_3$ as shown in FIG. 3) can substantially reduce the relative displacement offset (d'1, d'2 as shown in FIG. 3) among the optical waveguide cores 312 and thus can substantially reduce the coupling loss penalty. The waveguides of the facet coupling fanout device 314 can be made of made of simple Silica, SiON, or SiN. facet coupling fanout device 314 can be attached to the FAU 322 ahead of time to form an assembly.

Figure 6:
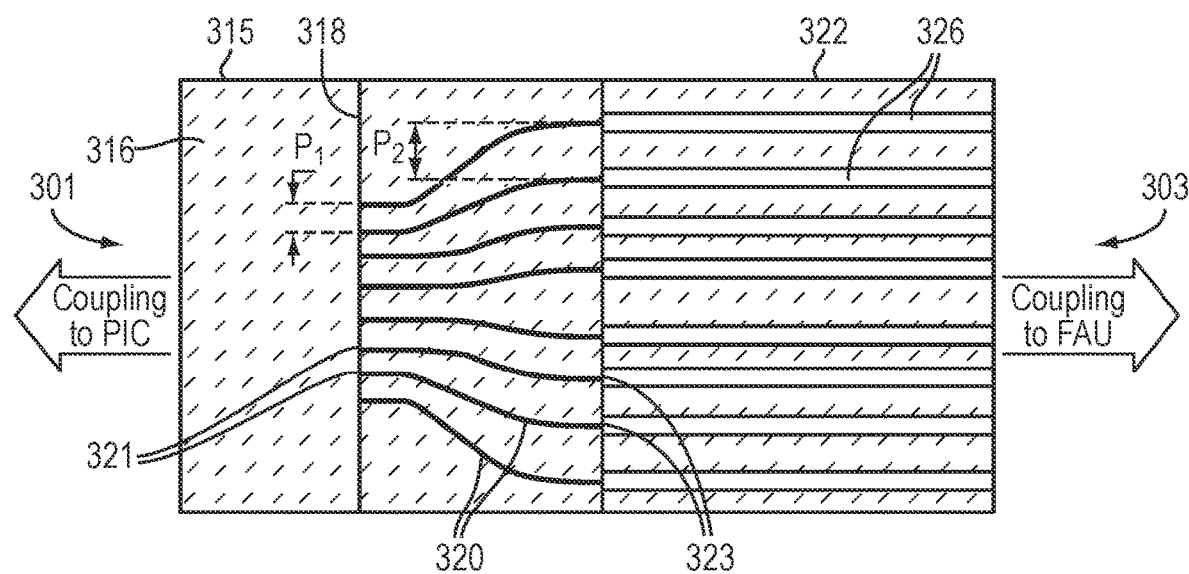
FIG. 6 is a top view of a facet coupling fanout device coupled to a fiber array unit according to an exemplary embodiment of the disclosure.

FIG. 6 is a top view of a facet coupling fanout device 314 coupled to a FAU 322 according to an exemplary embodiment of the disclosure. On the second optical coupling side 303, the facets 323 of the of the multi-channel waveguides 320 are aligned to couple to facets on V-grooves 326 of the FAU 322. The V-grooves 326 are configured for receiving optical fibers. In some embodiment, the facet coupling fanout device and the substrate of the FAU can be made on two different substrates which are attached together through for example adhesives. In some embodiment, the facet coupling fanout device and the substrate of the FAU can be made from the same substrate and there is no extra attachment required.

With reference now to FIGS. 3-6, on the first optical coupling side 301, the edge 318 of the facet coupling fanout device 314 abuts the side wall 319 of the PIC 304. The pitch of the optical waveguide cores 312 of the PIC 304 should match the pitch $P_1$ of the PIC coupling side of the facet coupling fanout device 314. In one embodiment, the pitch $P_1$ can be selected in a range from 10 µm to 30 µm and preferably can be selected as 20 µm to match the pitch $S_3$ of the between the optical waveguide cores 312. On the second optical coupling side 303, the pitch $P_2$ of the facet coupling fanout device 314 should match the pitch of the optical fiber bundle 324 of the FAU 322. In one embodiment, the pitch $P_2$ can be selected in a range from 110 µm to 140 m and preferably can be selected as 127 µm. Therefore, the facet coupling fanout device 314 can provide a greater than six-times (>6×) reduction in pitch of the optical waveguide cores 312 of the PIC 304. The reduced pitch of the optical waveguide cores 312 reduces the width of the coupling region ($W_3$ as shown in FIG. 3) to substantially reduce the relative displacement offset ($d'_1$, $d'_2$ as shown in FIG. 3). This can substantially reduce the coupling loss penalty.

Figure 7:
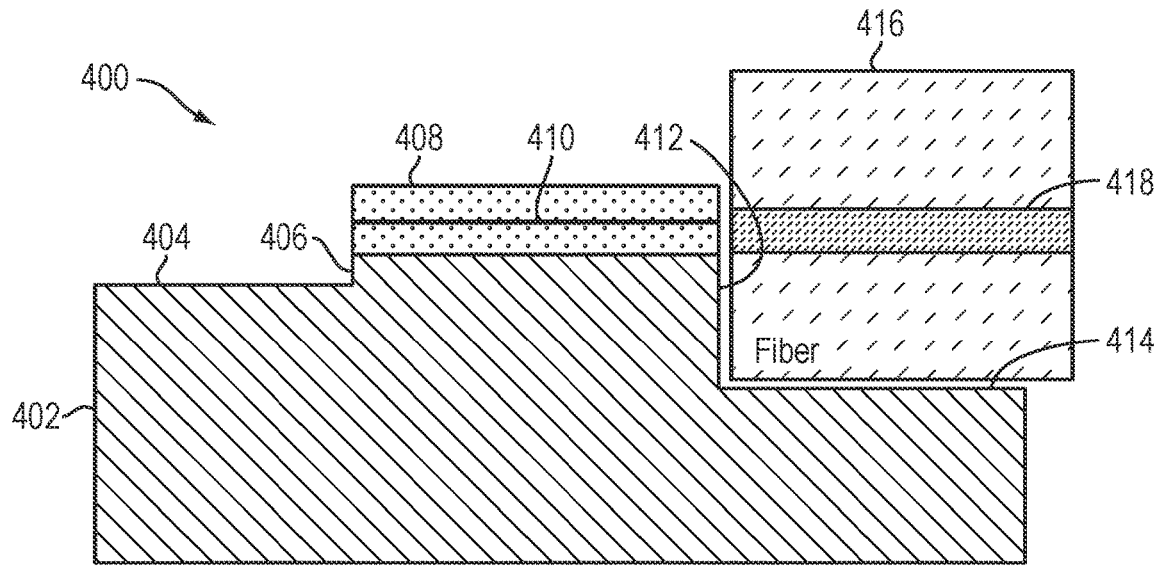
FIG. 7 is a side view of an optical coupling device optically coupled to an optical fiber cable according to an exemplary embodiment of the disclosure.
Figure 8:
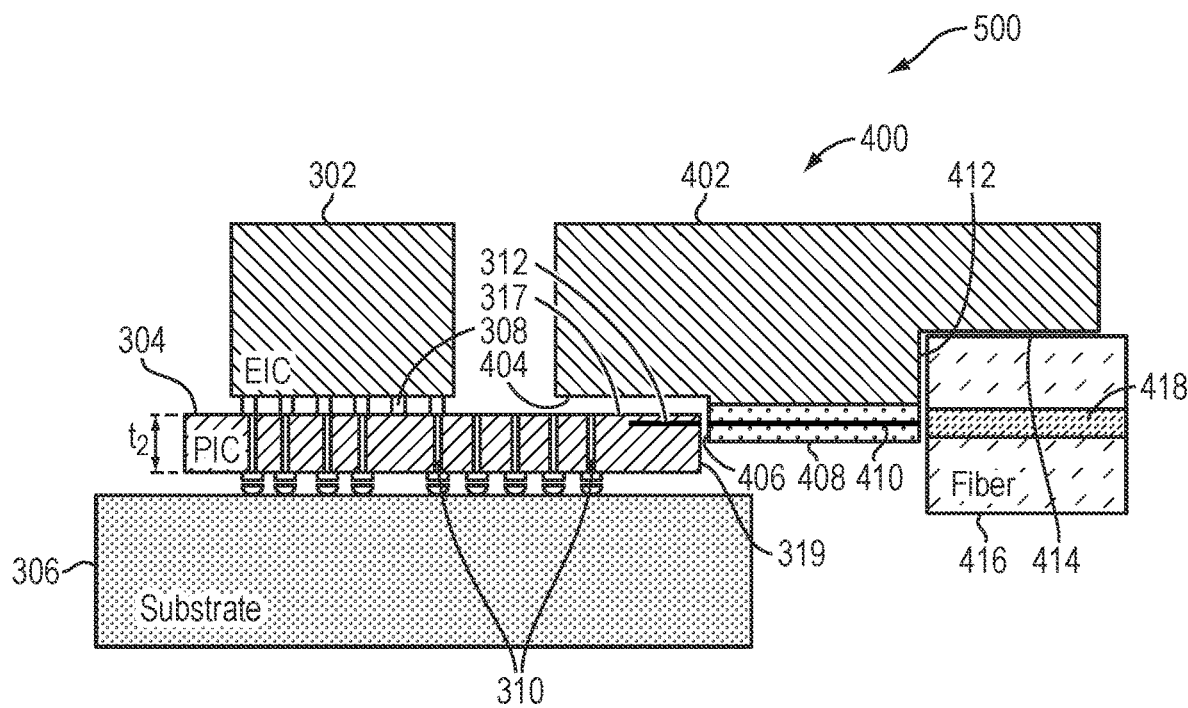
FIG. 8 is a side view of a photonic system comprising the optical coupling device shown in FIG. 7 coupled to the photonic integrated circuit shown in FIGS. 3 and 4 according to an exemplary embodiment of the disclosure.

FIG. 7 is a side view of an optical coupling device 400 optically coupled to an optical fiber cable 416 according to an exemplary embodiment of the disclosure. The optical coupling device 400 is configured to be coupled to the PIC 304 shown in FIGS. 3 and 4 to form a photonic system 500 as shown in FIG. 8 according to an exemplary embodiment of the disclosure. With reference now to FIGS. 7 and 8 together with FIG. 4, the optical coupling device 400 comprises an integrated waveguide 408 made on a substrate 402. The integrated waveguide 408 comprises an integrated facet coupling fanout device and a FAU. In one aspect, the integrated waveguide 408 comprises the facet coupling fanout device 314 and the FAU 322 shown in FIG. 4 integrated on a single substrate 402. An optical waveguide 410 optically couples to the optical waveguide cores 312 of the PIC 304 on one side and to a fiber cable 418 on the other side. In one embodiment, the integrated waveguide 408 provides pitch and mode adaptation as described herein in connection with FIGS. 3-6. The substrate 402 defines a shallow recess 404 to rest on a surface 317 of the PIC 304 and bond to the PIC 304 with an adhesive, such as epoxy, for example. The substrate 402 also defines an edge 406 that abuts a side wall 319 of the PIC 304. The substrate 402 also defines a deep groove 412 and ledge 414 for holding the fiber cable 418.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC § 112(f). Absent a recital of "means for" in the claims, such claims should not be construed under 35 USC § 112(f). Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

The invention claimed is:

1. A facet coupling fanout device, comprising:
   a body defining a plurality of multi-channel waveguides therein;
   a first optical coupling side configured to optically couple the plurality of multi-channel waveguides to a plurality of waveguide cores of a photonic integrated circuit (PIC), wherein a spacing between the plurality of waveguide cores is defined by a pitch S;

a second optical coupling side configured to optically couple the plurality of multi-channel waveguides to optical fibers of a fiber array unit (FAU);

wherein, the first optical coupling side defines a first pitch $P_1$ between the plurality of multi-channel waveguides and the second optical coupling side defines a second pitch $P_2$ between the plurality of multi-channel waveguides, wherein $P_2 > P_1$, and wherein the first pitch $P_1$ and the second pitch $P_2$ define a pitch ratio $$R = \frac{P_2}{P_1},$$

and wherein the pitch S is equal to the first pitch $P_1$.

2. The facet coupling fanout device of claim 1, wherein the body defines a recess providing a surface for attaching the body to the PIC.

3. The facet coupling fanout device of claim 2, wherein the body defines an edge configured to abut a side wall of the PIC.

4. The facet coupling fanout device of claim 1, wherein the pitch ratio R is selected in a range from 2 to 10.

5. The facet coupling fanout device of claim 4, wherein the pitch ratio R is selected in a range from 4 to 8.

6. The facet coupling fanout device of claim 4, wherein the pitch ratio R is selected in a range from 6 to 7.

7. The facet coupling fanout device of claim 1, wherein the first pitch $P_1$ is selected in a range from 10 μm to 30 μm.

8. The facet coupling fanout device of claim 1, wherein the second pitch $P_2$ is selected in a range from 110 μm to 140 μm.

9. A photonic system, comprising:
a photonic integrated circuit (PIC) comprising:
   a substrate; and
   a cladding formed on the substrate, wherein the cladding comprising a plurality of waveguide cores, wherein a spacing between the plurality of waveguide cores is defined by a pitch S; and
a facet coupling fanout device optically coupled to the PIC, the facet coupling fanout device comprising:
   a body defining a plurality of multi-channel waveguides therein;
   a first optical coupling side configured to optically couple the plurality of multi-channel waveguides to the plurality of waveguide cores;
   a second optical coupling side configured to optically couple the plurality of multi-channel waveguides to optical fibers of a fiber array unit (FAU);
   wherein, the first optical coupling side defines a first pitch $P_1$ between the plurality of multi-channel waveguides and the second optical coupling side defines a second pitch $P_2$ between the plurality of multi-channel waveguides is $P_2$, wherein $P_2 > P_1$, wherein the first pitch $P_1$ and the second pitch $P_2$ define a pitch ratio $$R = \frac{P_2}{P_1},$$

and wherein the pitch S is equal to the first pitch $P_1$.

10. The photonic system of claim 9, wherein the substrate has a thickness less than 150 μm.

11. The photonic system of claim 9, wherein the pitch S is selected in a range from 10 μm to 30 μm.

12. The photonic system of claim 9, wherein the pitch S is 20 μm.

13. An optical coupling device, comprising:
a substrate;
a facet coupling fanout device; and
a fiber array unit (FAU) optically coupled to the coupling fanout device;
wherein the facet coupling fanout device and the FAU are integrated on the substrate.

14. The optical coupling device of claim 13, wherein the facet coupling fanout device comprises:
a body defining a plurality of multi-channel waveguides therein;
a first optical coupling side configured to optically couple the plurality of multi-channel waveguides to a plurality of waveguide cores of a photonic integrated circuit (PIC);
a second optical coupling side configured to optically couple the plurality of multi-channel waveguides to optical fibers of the FAU;
wherein, the first optical coupling side defines a first pitch $P_1$ between the plurality of multi-channel waveguides and the second optical coupling side defines a second pitch $P_2$ between the plurality of multi-channel waveguides, wherein $P_2 > P_1$, and wherein the first pitch $P_1$ and the second pitch $P_2$ define a pitch ratio $$R = \frac{P_2}{P_1}.$$

15. The optical coupling device of claim 14, wherein the pitch ratio R is selected in a range from 2 to 10.

16. The optical coupling device of claim 14, wherein the first pitch $P_1$ is selected in a range from 10 μm to 30 μm.

17. The optical coupling device of claim 14, wherein the second pitch $P_2$ is selected in a range from 110 μm to 140 μm.

18. The optical coupling device of claim 13, wherein the substrate defines a recess for attaching to a photonic integrated circuit (PIC).

19. The optical coupling device of claim 13, wherein the substrate defines an edge to abut a side wall of a photonic integrated circuit (PIC).

20. The optical coupling device of claim 13, wherein the substrate defines a groove and a ledge to hold a fiber cable.

* * * * *